Patented Aug. 24, 1948

2,447,821

UNITED STATES PATENT OFFICE 2,447,821

PROCESS FOR MAKING NITROALKYL-CYCLIC AMINES

Murray Senkus, Terre Haute, Ind., assignor to Commercial Solvents Corporation, Terre Haute, Ind., a corporation of Maryland No Drawing. Application February 26, 1945, Serial No. 579,896

8 Claims. (Cl. 260—563)

My invention relates to new nitro amines and to a process for the preparation thereof. Specifically, these new compounds may be represented by the following structural formula:

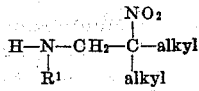

wherein $R^1$ represents a substituent selected from a group consisting of cycloalkyl (including alkylcycloalkyl) and 1-methyl-3,5-dioxacyclohexyl.

As examples of nitro amines coming within the scope of the above formula there may be mentioned the following: N-(2-nitroisobutyl)cyclohexylamine; 1-(2-nitro-2-methylbutylamino)-1-methyl-3,5-dioxacyclohexane; and the like.

This application is a continuation-in-part of my co-pending application, Serial No. 455,931, filed August 24, 1942, which has become abandoned.

Prior investigators in this field have found that primary nitroparaffins would react with N-(hydroxymethyl)dialkylamines; however, they also arrived at the conclusion, while making the aforesaid discovery, that N-(hydroxymethyl)-monoalkylamines would not react with primary nitroparaffins, and that secondary nitroparaffins would neither react with N-hydroxymethyl mono- nor dialkylamines under any of the experimental conditions which they had found to be effective in condensing a primary nitroparaffin with N-(hydroxymethyl)dialkylamines. Previous workers also were of the opinion, in view of their own experimental results, that neither primary nor secondary nitroparaffins would react with condensation products derivable from formaldehyde and ammonia, formaldehyde and primary alkylamines, formaldehyde and aniline, formaldehyde and diphenylamine, formaldehyde and N-methylaniline, and numerous other products of similar structure prepared from higher molecular weight aldehydes, and primary or secondary amines.

Contrary to that which would normally be expected in view of the above prior art findings, however, I have discovered that nitro amines of the type described may be prepared by reacting formaldehyde with a primary amine in which the N substituents are cyclic groups attached to the amino nitrogen directly through a ring member to form the corresponding N-hydroxymethyl amine, which is in turn reacted with an equimolecular amount of a secondary nitroparaffin to produce a nitro amine of the type represented by the generic formula given above.

A modification of the above procedure may frequently be employed to advantage, and consists of reacting the desired amine with a suitable nitro alcohol. A solvent may be used if desired, but in general it will be found that a homogeneous solution can be obtained by agitating the mixture of amine and nitro alcohol. The products, produced by this process, are identical with those synthesized by the first mentioned method; however, the mechanism of the reaction in its initial stages is materially different from that involved in the first procedure. In this connection, it has been observed that primary nitro alcohols, when in the presence of a substance appreciably basic in character, decompose into formaldehyde and the nitroparaffin from which they were derived, and in instances where the basic material happens to be a primary amine, the liberated formaldehyde reacts therewith to form a N-(hydroxymethyl) amine compound which then reacts with the nitroparaffin, produced by the decomposition of the nitro alcohol, in the same manner as described in the first procedure. The course of the reaction involved may be readily illustrated by the following series of equations:

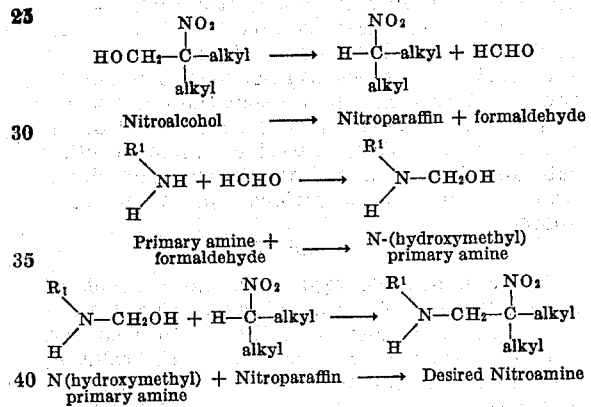

From an examination of the above series of equations, it will be evident that although the starting materials are different from those used in the process first described, both procedures may be considered equivalents of one another, since the compounds employed as starting materials in the first process are produced as intermediates in the second, after which said intermediates react in a manner identical with the mechanism involved in the reaction forming the basis of the first mentioned method.

The preparation of these nitro amines by either of the above-mentioned methods, is preferably effected at temperatures of from about 25°–30°

C. Temperatures above this range may be used, but in doing so care should be exercised to avoid temperatures which cause the formaldehyde to be volatilized from the reaction mixture. In some cases it may be desirable to carry out the reaction in a high pressure reaction vessel. Under such circumstances, substantially higher temperatures may be utilized without loss of formaldehyde, and decomposition of the reactants, or the reaction products.

The amines which may be employed in preparing these new compositions of matter are represented by the formula:

wherein $R^1$ represents a substituent selected from a group consisting of cycloalkyl (including alkylcycloalkyl) and 1-methyl-3,5-dioxacyclohexyl. As examples of such amines, there may be mentioned cyclohexylamine, 1-methyl-1-cyclohexylamine, 5-amino-5-methyl-1,3-dioxane, and the like.

Nitroparaffins that are operative in my process may be represented by the following formula:

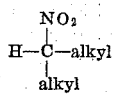

Nitroparaffins typical of this class are 2-nitrobutane, 2-nitropropane, 2-nitropentane, and the like.

In reaction wherein nitro alcohols are employed instead of a nitroparaffin and formaldehyde, the following are examples of typical nitro alcohols which may be utilized: 2-nitro-2-methyl-1-propanol, 2-nitro-2-methyl-1-butanol, 2-nitro-2-ethyl-1-butanol, and the like.

The examples which follow are illustrative of the various types of nitro amines that come within the scope of the present invention. The examples are likewise illustrative of the procedures by which said products may be synthesized. It is to be specifically understood, however, that the following examples in no way limit the scope of my invention with respect to either the product or the process, since I have found that the reaction involved is very general in nature, and will occur, under the conditions described when reacting substantially any secondary nitroparaffin with a primary amine of the various types enumerated above.

*Example I*

One mole of cyclohexylamine and one mole of 2-nitro-2-methyl-1-propanol were placed in a glass-stoppered vessel and the mixture shaken until it had become homogeneous. The solution was allowed to stand at room temperature and water began to separate as a lower layer after 10 hours. After the water separation was substantially complete the upper layer containing the crude product, N-(2-nitroisobutyl)cyclohexylamine, was separated from the lower aqueous layer and fractionated under reduced pressure. 136 parts of the product were obtained amounting to a conversion of 68%. The nitrogen content found was 14.22% as compared to a calculated value of 14.00%. The boiling point of the product was 106–108° C. at 2 mm. pressure and was a solid having a melting point of 24.0°.

*Example II*

One mole of 1-methyl-1-cyclohexylamine and 1 mole of 2-nitro-2-methyl-1-propanol were placed in a glass-stoppered vessel and the mixture shaken until it had become homogeneous. The solution was allowed to stand at room temperature and water began to separate as a lower layer after 10 hours. After the water separation was substantially complete the upper layer containing the crude product, 1-(2-nitroisobutylamino)-1-methylcyclohexane, was separated from the lower aqueous layer and fractionated under reduced pressure. 107 parts of the product were obtained amounting to a conversion of 50%. The nitrogen content found was 12.83% as compared to a calculated value of 13.06%. The boiling point of the product was 96–97° C. at 1.5 mm. pressure and $n_D^{20}$ was 1.4707 and $$d_{20}^{20}$$

was 1.0043. The process of this example illustrates the use of a cycloalkyl compound which is an alkylcycloalkyl compound.

*Example III*

520 parts of 5-amino-5-methyl-1,3-dioxane and 526 parts of 2-nitro-2-methyl-1-propanol were placed in a glass vessel and heated on a steam bath for five hours. The mixture was then cooled to room temperature whereupon crystals formed. The crystals were filtered and washed with 500 parts of water which had been cooled to 0° C. The crystals were dried in air for 24 hours and when dry yielded 870 parts of white crystalline N-(1-methyl-3,5-dioxacyclohexyl)-2-nitroisobutylamine corresponding to a conversion of 90%. After recrystallization from water the material melted at 66.9° C. and had a nitrogen content of 12.16% as compared to a calculated value of 12.84% for $C_9H_{18}N_2O_4$.

*Example IV*

To 235 parts of 5-amino-5-methyl-1,3-dioxane in a reaction vessel were added 150 parts of 35% aqueous formaldehyde. The mixture was agitated until it became homogeneous and then 250 parts of methanol and 180 parts of 2-nitropropane were added to the mixture and the mixture was refluxed for five hours at a pot temperature of about 90° C. The mixture was then removed from the distillation vessel and allowed to cool whereupon crystals separated. The crystals were recovered by fractionation and washed with 200 parts of water cooled to 0° C. and dried in air for 24 hours. The dry crystals amounted to 310 parts N-(1-methyl-3,5-dioxacyclohexyl)-2-nitroisobutylamine corresponding to a conversion of 75%.

The nitro amines of my invention are in general either colorless liquids or white waxy solids. The low-molecular-weight nitro amines possess characteristic pungent odors, whereas the high-molecular-weight nitro amines are relatively odorless. The nitro amines are soluble in ether, methanol, and benzene, but are insoluble in water.

Some of the nitro amines of my invention have been found to be useful as toxicants in insect sprays. They are likewise useful as intermediates in the preparation of numerous organic compounds. Other uses of these products will readily occur to those skilled in the art.

Now having described my invention, what I claim is:

1. N-(2-nitroisobutyl) cyclohexylamine.

2. In the production of nitro amines having the following structural formula:

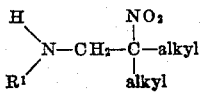

wherein $R^1$ represents a substituent group selected from a class consisting of cycloalkyl and 1-methyl-3,5-dioxacyclohexyl the process which comprises reacting, under conditions forming a homogeneous mixture, substantially equimolecular proportions of formaldehyde, an amine having the formula $R^1$—N=$H_2$ and a nitroalkane having the formula:

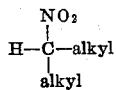

allowing the mixture to stand until the resulting reaction is substantially completed and recovering the said nitro amine.

3. The process of claim 2 wherein said homogeneous mixture contains an inert solvent for the reactants.

4. The process of claim 2 wherein the formaldehyde and the nitroalkane in the reaction mixture are derived from the decomposition in the mixture of a nitroalcohol having the structural formula:

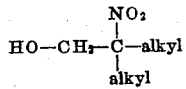

5. The process of claim 2 wherein the reaction is carried out at a temperature of about 25° to 30° C.

6. In the preparation of N-(2-nitroisobutyl) cyclohexylamine, the process which comprises forming a homogeneous mixture of substantially equimolecular proportions of cyclohexylamine and 2-nitro-2-methyl-1-propanol and permitting the mixture to stand until the reaction is completed.

7. In the preparation of 1-(2-nitroisobutylamino)-1-methylcyclohexane, the process which comprises forming a homogeneous mixture of substantially equimolecular proportions of 1-methyl-1-cyclohexylamine and 2-nitro-2-methyl-1-propanol and permitting the mixture to stand until the reaction is completed.

8. In the preparation of N-(1-methyl-3,5-dioxacyclohexyl)-2-nitroisobutylamine, the process which comprises forming a homogeneous mixture of substantially equimolecular proportions of 5-amino-5-methyl-1,3-dioxane and 2-nitro-2-methyl-1-propanol and permitting the mixture to stand until the reaction is completed.

MURRAY SENKUS.

REFERENCES CITED

The following references are of record in the file of this patent:

UNITED STATES PATENTS

| Number | Name | Date |
|---|---|---|
| 2,206,885 | Dickey | July 9, 1940 |
| 2,253,082 | McNally | Aug. 19, 1941 |
| 2,292,212 | Dickey et al. | Aug. 4, 1942 |
| 2,381,408 | Senkus | Aug. 7, 1945 |

OTHER REFERENCES

DeMauny, "Bull. Soc. Chem. France," Series 5, Vol. 4, (1937), pages 1451 to 1468.